United States Patent
Kaste et al.

(10) Patent No.: US 11,970,178 B2
(45) Date of Patent: Apr. 30, 2024

(54) COMPUTER-IMPLEMENTED METHOD FOR MACHINE LEARNING FOR OPERATING A VEHICLE COMPONENT, AND METHOD FOR OPERATING A VEHICLE COMPONENT

(71) Applicant: Volkswagen Aktiengesellschaft, Wolfsburg (DE)

(72) Inventors: Jonas Kaste, Alfeld (DE); Kristof van Ende, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 489 days.

(21) Appl. No.: 17/380,421

(22) Filed: Jul. 20, 2021

(65) Prior Publication Data

US 2022/0024474 A1    Jan. 27, 2022

(30) Foreign Application Priority Data

Jul. 21, 2020   (EP) .................................... 20187076

(51) Int. Cl.
*B60W 50/06* (2006.01)
*G06N 20/00* (2019.01)

(52) U.S. Cl.
CPC ............. *B60W 50/06* (2013.01); *G06N 20/00* (2019.01)

(58) Field of Classification Search
None
See application file for complete search history.

(56) References Cited

U.S. PATENT DOCUMENTS

2020/0026960 A1*  1/2020  Park ...................... G06V 10/82

OTHER PUBLICATIONS

Lynch, Jr. et al., "Utilizing Fused Features to Mine Unknown Clusters in Training Data", 2006 9th International Conference on Information Fusion, pp. 1-7, Jul. 1, 2006 (Year: 2006).*
Cervantes et al. "Support Vector Classification for Large Data Sets by Reducing Training Data with Change of Classes", 2008 IEEE International Conference on Systems, Man and Cybernetics, pp. 2609-2614, Oct. 1, 2008 (Year: 2008).*
Ul Haq et al., "Combining Multiple Feature-Ranking Techniques and Clustering of Variables for Feature Selection", IEEE Access, vol. 7, pp. 151482-151492, Jan. 1, 2019 (Year: 2019).*

(Continued)

*Primary Examiner* — Tamara L Weber
(74) *Attorney, Agent, or Firm* — Slayden Grubert Beard PLLC

(57) ABSTRACT

The invention relates to a method for preparing or generating a training data set for machine learning to operate a vehicle component. Provided multidimensional data points are divided up in a first step by dividing up the plurality of data points into multidimensional clusters by using a cluster algorithm. Then a training data set is generated by selecting data points from the basic training data set. The selection comprises determining a smallest cluster among the plurality of clusters with the lowest number of data points. Furthermore, at least one subset of the data points of the smallest cluster is provided for the training data set. In another step, a subset of data points is selected from each of the other clusters for the training data set, wherein the number of selected data points of each other cluster corresponds to the number of selected data points of the smallest cluster.

20 Claims, 7 Drawing Sheets

(56) References Cited

OTHER PUBLICATIONS

Pham, D.T. et al., "Technique for Selecting Examples in Inductive Learning," ESIT 2000, URL: http://siteseerx.ist.psu.edu/viewdoc/download?doi=10.1.1.4.8685&rep-rep1&type=pdf, 9 pages, Sep. 14, 2000.
European Extended Search Report, Application No. 20187076.3, 6 pages, dated Nov. 3, 2020.

* cited by examiner

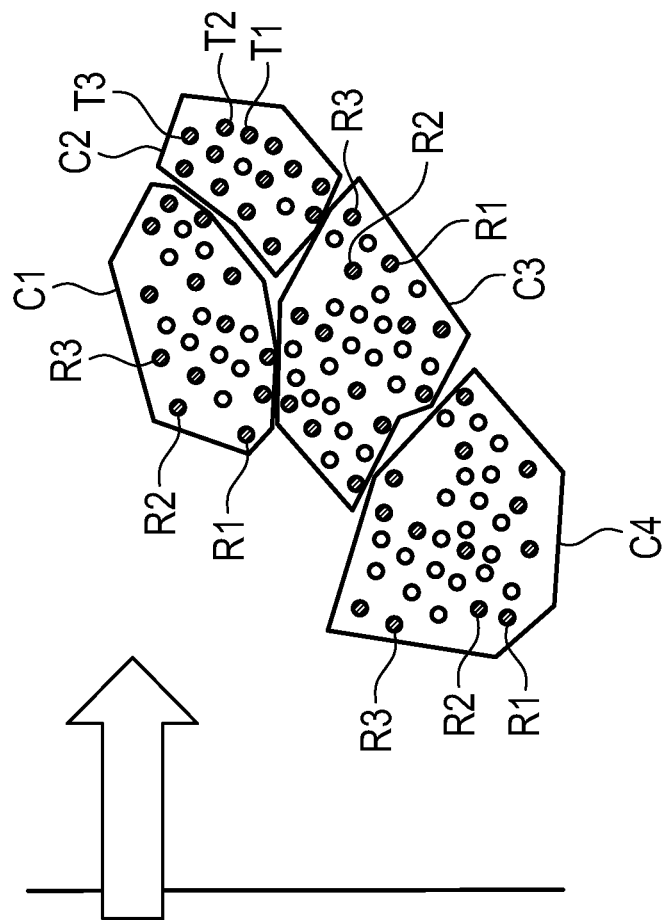
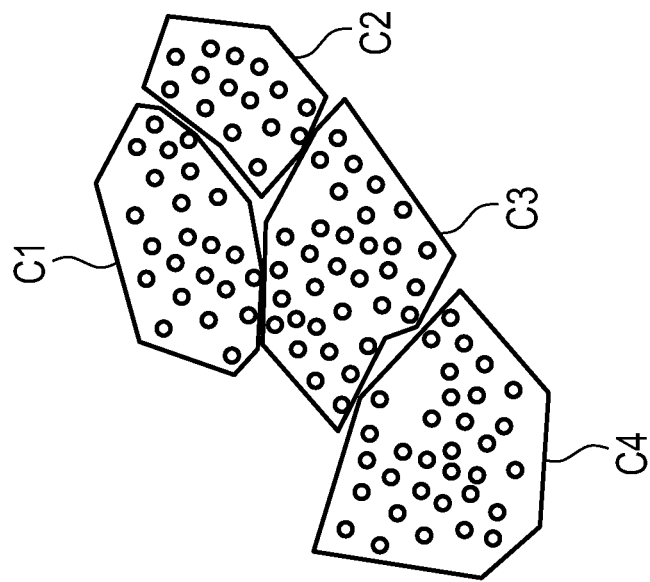
Fig. 3

COMPUTER-IMPLEMENTED METHOD FOR MACHINE LEARNING FOR OPERATING A VEHICLE COMPONENT, AND METHOD FOR OPERATING A VEHICLE COMPONENT

CROSS-REFERENCE TO RELATED APPLICATIONS

This application claims priority to European Patent Application No. EP 20187076.3, filed on Jul. 21, 2020 with the European Patent Office. The contents of the aforesaid Patent Application are incorporated herein for all purposes.

TECHNICAL FIELD

The invention relates to a computer-implemented method for machine learning, in particular for preparing, or respectively generating, a training data set for operating a vehicle component, and a corresponding method for operating a vehicle component. Furthermore, a corresponding control unit as well as a corresponding vehicle are provided.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The training in prior art machine learning methods manifests inefficiencies when data sets are unevenly distributed with over- or underrepresented scenarios. In the event of previously unknown data, the performance may therefore be poor. This in turn results in a significant impairment of the robustness of the method and utility in a safety-critical environment.

Only as technical background, reference is made to the prior art that addresses different, very special problems under very extremely poor distribution conditions between so-called minority and majority classes in the initial data set. In the publication, S. Yen et al., "Cluster-based undersampling approaches for imbalanced data distributions", Expert System with Applications 36, 2009, pp. 5718-5727, doi:10.1016/j.eswa.2008.06.108, a weighted distribution of these rare minority classes is described. In the publication, M. Mostafizur Rahman et al., "Cluster based under-sampling for unbalanced cardiovascular data", Proceedings of the World Congress on Engineering, 2013, Vol. III, ISSN: 2078-0966 (online), this very special case of minority classes is also addressed. The initial data set is divided according to majority class and minority class, wherein clustering is only carried out with respect to the majority classes, and subsequently many data sets are achieved by pairing each cluster with the minority classes. The best pair of these combinations is then used as a training data set.

Apart from these special problems, methods are executed in the prior art in which the training performance is tested and then validated based on independent data. In doing so, typically very large data sets are used that depict the target behavior.

Furthermore, with large data sets, a great amount of computing effort arises due to the large data sets, the data set preparation such as for example labeling and anonymization, and increased computing resources must be provided to process these large amounts of data for the training process.

Iterative manual data set generation is prone to errors and frequently slow due to trial and error. Taking into account all the data also results in time-consuming and ineffective training.

Furthermore, the analysis of instances of failure is frequently based on expert knowledge. The difficulties in this case are inter alia both the linkage of various causes as well as the complex detection of parameters. The approach to a solution is generally to use more data in order to achieve improved performance. There is no objective analysis of the multidimensional space. In order to expand, or respectively enlarge the data sets, an analysis is performed by experts.

Particularly the field of vehicles is an area critical to safety in which a wide range of vehicle components must be operated with high safety requirements. High-performance and rapid training times are of decisive importance, particularly in this area. When operating vehicle components with the support of algorithms by using machine learning, the training data set and the performance sometimes may be key in determining whether a critical error occurs.

SUMMARY

A need exists to provide a computer-implemented method for machine learning to operate a vehicle component, and a corresponding method for operating a vehicle component that solves or at least minimizes part of the aforementioned problems.

This need is addressed by the subject matter of the independent claims. Embodiments of the invention are described in the dependent claims, the following description, and the drawings.

BRIEF DESCRIPTION OF THE DRAWINGS

FIGS. 1-6 show example steps of a computer-implemented method for machine learning for operating a vehicle component, and an example method for operating the methods for operating the vehicle component according to the embodiments.

DESCRIPTION

Figure 1:
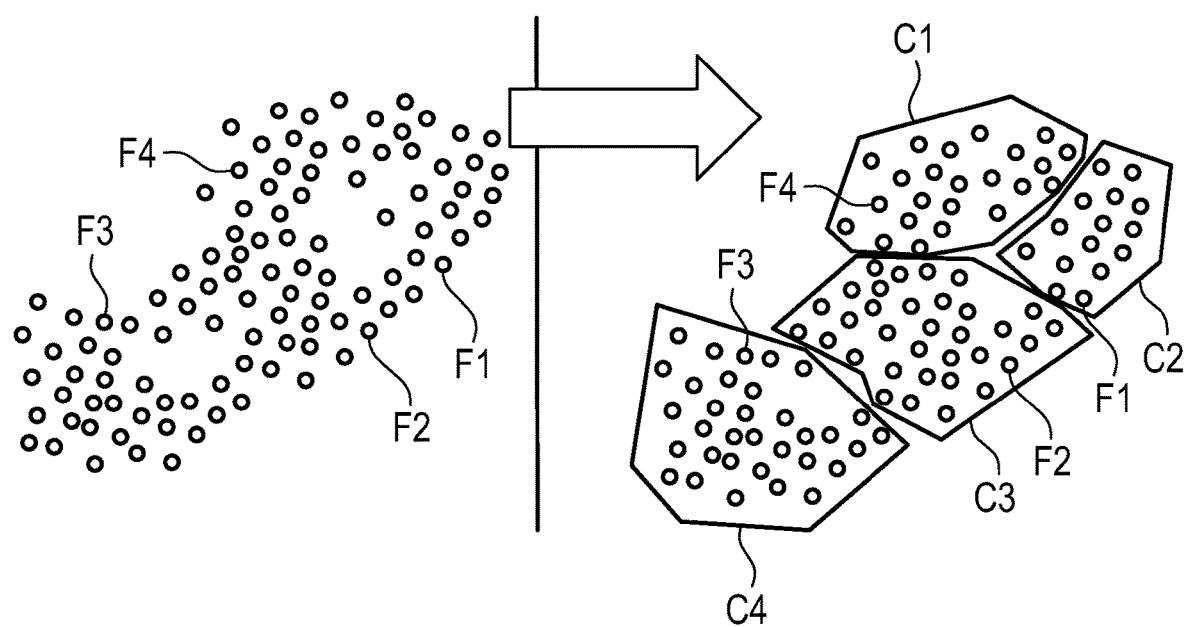

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect provides good performance in all scenarios, and simultaneously provides time and resource saving generation of training data sets. Furthermore, an exemplary goal is to achieve the requirements for time-efficient training in combination with high precision.

In some embodiments, a computer-implemented method, in particular for preparing, or respectively generating a training data set is provided for machine learning to operate a vehicle component. In a first step, the method comprises the provision of a plurality of multidimensional data points.

In another step, the method comprises generating a basic training data set by dividing up the plurality of data points into multidimensional clusters using a cluster algorithm, wherein each data point is assigned precisely to one cluster. In another step, a training data set is generated by selecting data points from the basic training data set. The generation of the training data set comprises determining a smallest cluster among the plurality of clusters with the lowest number of data points. In another step, the generation of a training data set comprises selecting at least one subset of the data points of the smallest cluster for the training data set. Furthermore in another step, a subset of data points is selected from each of the other clusters for the training data set such that the number of selected data points of each other cluster corresponds to the number of selected data points of the smallest cluster.

A multidimensional data point may be represented by a vector and provided with a plurality of entries. The amount of data points may form a time series. For example, the multidimensional data point may comprise physical, or respectively kinematic quantities such as vehicle speed, location, orientation, steering torque, transverse acceleration, yaw rate, steering wheel angle speed, acceleration or also trajectories or trajectory sections, wherein the above examples are only an example of a list, and the invention is not restricted thereto. Data points are in principle measuring data points relating to the vehicle, for example sensor data points, i.e., quantities that may be detected by the sensors. For example, the tire pressure may also be an entry of the data point. The data points may for example be sensor signals. In other cases, the data points are simulated data or data provided by a server that were obtained from a previous measuring process. The sensor signals may be captured by a plurality of sensors of the vehicle, for example by different sensors of the vehicle. A k-means algorithm may for example be used as the cluster algorithm. However, the invention does not depend upon the employed cluster algorithm. For example, EM clustering or a fuzzy C-means algorithm, etc. may be used. Each cluster represents a particular scenario. A scenario furthermore represents a clearly separable subset of the entire data set. A scenario may be differentiated by the multidimensional entries of the cluster algorithm. By clustering, relevant areas of the overall unstructured database are automatically extracted. A cluster algorithm that clearly assigns one cluster to each data point is termed a hard method. Data are for example physical and/or kinematic data that are needed to determine a target size or setpoint size for operating a vehicle component of the vehicle.

The benefit is that an automatic, even distribution of the training data set is produced over the various scenarios. This is achieved in that precisely the same number of data points are taken from the other clusters for the training data set. Focusing on the smallest cluster is beneficial since this represents a scenario that is underrepresented in comparison to the other clusters due to the small number of data points. In the new training data set, the previously underrepresented cluster is weighted equally, or respectively represented like the other clusters. Each cluster, and therefore each scenario, is therefore treated equally because of the generated even distribution of the clusters based on, and with respect to, the number of data points of the clusters generated by the cluster algorithm. By specifically reducing the data points, a significant amount of training time may furthermore be saved, and a data pool of test and validation data may also be provided. The performance of the evenly distributed data set is furthermore better. In this case and in the following, an objective method is created for taking into account the multidimensional analysis of the data that is subjectively difficult to grasp given the complexity and multidimensionality.

Further embodiments result from the remaining features specified in the dependent claims.

For example, the method may comprise saving the unselected data points of the smallest cluster and/or the other clusters in a data memory as test and/or validation data. The data points that are not used therefore represent a data pool which may be used to test and validate an algorithm for machine learning as well as its performance. Furthermore, the data points for improving the training data set may be used with respect to cluster performance as will be described below. If data points from the smallest cluster are also saved, its performance may also be checked.

In some embodiments, the method comprises selecting the totality of all data points of the smallest cluster for the training data set. The smallest cluster of the basic data set is in principle underrepresented due to the lowest number of data points. Therefore typically all, or respectively nearly all, data points of this cluster are also needed to sample the cluster in order to sufficiently define, or respectively characterize the cluster.

For example, the method comprises the random selection of data points from the smallest cluster and/or the other clusters for the training data set. This is a particularly fast method by means of which an even distribution of the training set may be automatically achieved very rapidly. In other embodiments, the selection may also be made according to time criteria.

In some embodiments, the method comprises the selection of the data points from the smallest cluster and/or the other clusters such that the selected data points of a cluster have a maximum distance from each other. Given the criterion of distance, redundant data are removed, and the relevant data for defining, or respectively covering the cluster are retained. For example in other words, a maximum cluster spread is achieved. The selection of the data points therefore follows a relevance criterion.

For example, the method may comprise training an algorithm for machine learning by means of the generated training data set. Such training may provide information on whether the created training data set may or has to still be improved. For example, an artificial neural network is a possible algorithm for machine learning, wherein the invention is not restricted thereto, and other relevant algorithms for machine learning are also used. Monitored training with specified target results are for example used for training. To achieve an optimum algorithm operating point for machine learning, the test data of the unselected data points may be used. With the test data, overadaptation, also termed overfitting of the algorithm for machine learning may be avoided.

In some embodiments, the method comprises determining the performance of the individual clusters by means of a quality criterion by using validation data. By localizing the performance of the individual clusters, i.e., for example the quality, or respectively precision of the individual clusters, it may accordingly be checked whether the data points used for the particular cluster were sufficient, or whether the data points for this cluster must be increased and therefore compressed.

For example, the performance of the individual clusters is determined by the data points from the group of unselected data points of the associated cluster. If a data point was taken as a valid datum from a certain cluster and used for validation, the validation result may therefore be particularly informative about the performance of the associated cluster. The previously unselected data points are therefore sensitive, or respectively selective for those clusters from which they were taken. If data points were taken from the smallest cluster, this smallest cluster may also be checked with respect to its performance.

For example, the quality criterion may be a mean square deviation above a threshold value of an output value relative to the target value. In certain cases, a certain number of such exceeded threshold values may also be used as a quality criterion. The mean square deviation and for example the exceeded thresholds represent a sensitive measure of the performance of the individual clusters.

In some embodiments, the method comprises creating a modified training data set by adding data points to a cluster for which the quality criterion has not been met. This allows specific, or respectively local individual clusters to be improved, i.e., their statistics or respectively data point density to be improved in order to specifically, or respectively targetedly improve their performance. The benefit is that only those clusters are improved that do not satisfy a quality criterion, and efficient improvement is therefore possible since the already performant clusters are not changed.

For example, added data points are taken from the group of unselected data points of the associated cluster for which the quality criterion is not met. This allows the previously unselected data points to be specifically reused in order to enhance the individual clusters by compression, or respectively greater representation. With the unselected data points, highly suitable data points are for example available for each cluster so that data points are available in the data pool that are always appropriate.

In some embodiments, the method comprises repeating the modification of the training data set until the quality criterion is satisfied for all clusters. The above steps comprising the performance check may be executed until all clusters satisfy the quality criteria.

Accordingly, starting from the basic training data set, a performant training data set has been generated that describes each scenario according to quality criteria, or respectively is performant in each cluster. Nonetheless by omitting redundant data points, significant computing time may be saved by the above described systematic automated creation of the training data set as already described in the above sections.

Another exemplary aspect comprises a method for operating a vehicle component. This method comprises operating the vehicle component based on an output of an algorithm for machine learning trained according to the method according to one of the above embodiments. In this case and in the following, "operating" may comprise controlling and/or regulating. "Operating" may furthermore be monitoring, maintenance and warning, wherein the invention is not restricted thereto. Purely as examples, a vehicle component may be a steering apparatus, a driving assistance system, a braking apparatus, a warning system, a lighting unit, without limitation. However in this case, the invention is not restricted to a certain vehicle component. By using the algorithm trained in this manner for machine learning, its high accuracy, precision and performance is exploited directly to enable sensitive and safe operation of the vehicle component, for example in an area critical to safety.

In some embodiments, a method is provided for operating a vehicle component. In a first step, the method for operating a vehicle component comprises the provision of a plurality of multidimensional data points. In another step, the method comprises generating a basic training data set by dividing up the plurality of data points into multidimensional clusters using a cluster algorithm, wherein each data point is assigned precisely to one cluster. In another step, a training data set is generated by selecting data points from the basic training data set. The generation of the training data set comprises determining a smallest cluster among the plurality of clusters with the lowest number of data points. In another step, the generation of a training data set comprises selecting at least one subset of the data points of the smallest cluster for the training data set. Furthermore in another step, a subset of data points is selected from each of the other clusters for the training data set such that the number of selected data points of each other cluster corresponds to the number of selected data points of the smallest cluster. Other method steps may be found in the method described above and in the following. Furthermore, the method comprises the step of operating the vehicle component based on an output of an algorithm for machine learning trained with the generated training data set. The other embodiments of the method are furthermore also combinable and therefore also disclosed with the method for operating the vehicle component. By using the algorithm trained in this manner for machine learning, its high accuracy, precision and performance may be exploited, which is relevant especially in areas critical to safety.

Another exemplary aspect comprises a control unit for a vehicle that is configured to execute the method for operating a vehicle component, or respectively the method according to one or more of the above and following embodiments. The benefits are apparent from the above statements.

An additional exemplary aspect comprises a vehicle comprising a control unit according to the above statements.

The various embodiments mentioned in this application may beneficially be combined with one another, if not stated otherwise in individual cases.

The invention will be discussed in more detail in the following using further exemplary embodiments in connection with the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIGS. 1 to 6 show a computer-implemented method, for example for preparing, or respectively generating a training data set for machine learning for operating a vehicle component, and a method comprising this method for operating a vehicle component. In the following when only one method is referenced, this always includes both methods if not expressly disclosed otherwise.

FIG. 1 shows an illustration of a first method step in which a plurality of multidimensional data points F1, . . . , Fn is provided (see the left side of FIG. 1). The data points F1, . . . , Fn may be measuring data points, for example measured or respectively recorded by corresponding sensors. A server may also provide previously measured measuring data points. In principle, these data points F1, . . . , Fn may however also be simulated measuring data points. A data points such as data point F1 may be depicted as a vector with corresponding kinematic, or respectively physical entries. Each entry may comprise a numeric value and dimension. The teachings herein also disclose the instance in which the vector only has one component. The particular quantities may for example be a vehicle speed, steering torque, transverse acceleration, yaw rate, steering angle speed, tire pressure or driving trajectories or driving trajectory sections, wherein the invention is not restricted thereto. The selection of the relevant entries for a certain use depends on the particular vehicle component and how this vehicle component is to be operated.

In another step (see the right side of FIG. 1 for illustration), a basic training data set is created. This step is performed by dividing up the plurality of data points $F1, \ldots, Fn$ into multidimensional clusters $C1, \ldots, Cm$. To accomplish this, a cluster algorithm is used that assigns each data point $F1, \ldots, Fn$ to precisely one cluster $C1, \ldots, Cm$. Expressed otherwise, the data points $F1, \ldots, Fn$ are grouped into clusters according to known scenarios. Each cluster $C1, \ldots, Cm$ therefore forms a certain scenario. In this case, a scenario may be considered a clearly separable subset from the overall unstructured database of the data points $F1, \ldots, Fn$; in this regard, compare the left side of FIG. 1 with the right side. This means that scenarios may be described and differentiated by the multidimensional inputs of the cluster algorithm. Relevant work areas are therefore extracted automatically.

In the present example that only serves for illustration, the data points $F1, \ldots, Fn$ are distributed, or respectively divided into four different clusters C1, C2, C3, C4. Purely by way of example, there are four different scenarios in the present case. The clusters C1, C2, C3, C4 are furthermore disjunct, i.e., each data point $F1, \ldots, Fn$ is assigned precisely to one cluster C1, C2, C3, C4. In practice, a number of data points and/or clusters exist that exceed the above example by orders of magnitude.

Figure 2:
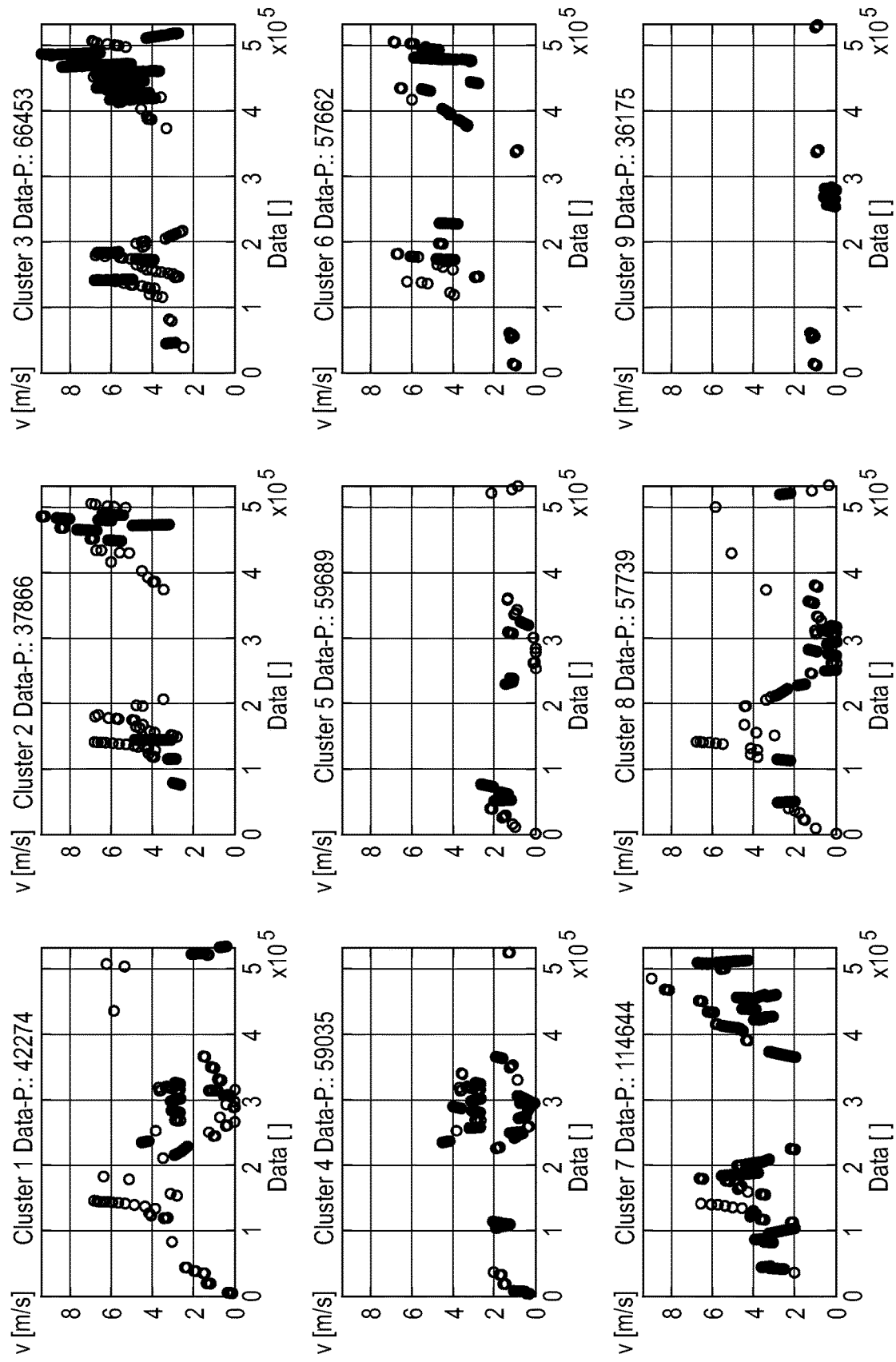

FIG. 2 shows real data in addition to FIG. 1 to further illustrate the above description. In this case, various clusters are shown, in this specific example cluster 1 through cluster 9, that each show data assigned to a cluster. The assignment is performed by a cluster algorithm, for example by the k-means algorithm, as described above. In doing so, each cluster $C1, \ldots, C9$ forms a particular scenario. In the present example, the vehicle speed v is shown as a physical, or respectively kinematic quantity, wherein the invention is not restricted thereto. Alternatively, the already mentioned quantities such as tire pressure, steering torque, steering speed, etc. may be used depending on which vehicle component is to be operated and which quantity is relevant therefor. Furthermore, only this one component of a vector is shown in this case, whereas in the event of multidimensional data points $F1, \ldots, Fn$, a corresponding multidimensional cluster is formed that cannot be graphically depicted. Furthermore it may be seen that the number of data points as illustrated in FIG. 1 differs from cluster to cluster. This means that some clusters are statistically overrepresented, or respectively underrepresented in comparison to other clusters.

The number of data points within the smallest cluster, in this case for example cluster 9, therefore represents a scenario which is underrepresented in comparison to all other subsets (clusters) in the overall data set.

Redundancies, i.e., basically multiple descriptions of a data point, may be recognized in the larger clusters; see for example clusters 3 and 7. Such redundancies are reduced, or respectively eliminated by the following steps.

FIG. 3 illustratively shows a method step in which a training data set is created by selecting data points from the basic training data set. In doing so, the method comprises the determination of a smallest cluster. In this depiction only for illustration, the smallest cluster corresponds for example to the cluster C2 among the plurality of clusters C1, C2, C3, C4. The smallest cluster comprises the smallest number of data points. In FIG. 2, for example, cluster 9 corresponds to the smallest cluster among the group of clusters 1 to 9.

In another step, at least one subset of the data points T1, T2, T3, ..., Tk of the smallest cluster C2 is selected for the training data set; see by way of illustration the marked, or respectively highlighted data points in cluster C2 on the right side of FIG. 3. In the present case, a percentage, or respectively a subset, in this case for example 90%, of the data points of the smallest cluster C2 is selected for the training data set. The benefit of this is that a percentage complementary therewith, in the present example 10%, may be saved and used as test and/or validation data for an algorithm for machine learning in a corresponding data memory (see the description below).

The selection of the subset of the data points T1, T2, T3, ..., Tk of the smallest cluster may for example be random, i.e., according to a random process. This represents a particularly fast selection process that is time-effective. For example, a selection may however be made according to a metric of relevance. For example, the data points T1, ..., Tk may be selected from the smallest cluster such that the selected data points T1, ..., Tk of the smallest cluster have a maximum distance from each other. This effectively eliminates redundancies in the smallest cluster. Furthermore, the data points T1, ..., Tk selected according to this criterion suitably form the geometric extension of the multidimensional cluster which in turn improves the performance of the algorithm for machine learning in the application. Expressed otherwise, the data points T1, ..., Tk selected according to this criterion produce a maximum spread of the cluster so that the cluster is effectively defined without, or at least with only slight redundancies.

In some embodiments, the totality of all data points of the smallest cluster may also be selected for the training data set (not expressly shown in this case). This is for example beneficial when the number of data points is such that ultimately each of these data points T1, ..., Tk is required for sufficient cluster performance of the smallest cluster (see the following descriptions).

In another step, a subset of the data points R1, ..., Rk is selected from each of the other clusters C1, C3, C4 for the training data set. The selection is such that the number of selected data points R1, ..., Rk of each other cluster, in FIG. 3 the clusters C1, C3, C4, correspond to the number of selected data points T1, ..., Tk of the smallest cluster C2. The number of data points of each cluster C1, ..., Cm is therefore identical with each other and accordingly for example identical with number of data points selected from the smallest cluster T1, ..., Tk. The number of selected data points of the smallest cluster therefore identically establishes the number of selected data points R1, ..., Rk of each of the other clusters.

The teachings herein therefore may have the property of an evenly distributed, automatically generated training data set being generated over the various scenarios, which enhances performance and is therefore also relevant for example while operating vehicle components. Focusing on the smallest cluster is done with the awareness that this scenario is underrepresented in comparison to the other clusters due to the small number of data points. In the generated training data set, the previously underrepresented cluster is represented in the same way as the other clusters. In doing so, the compilation is solely based on the number of particular data points.

The reduction of the data points in the other clusters furthermore yields reduced training time. Such a reduction may be significant when the clusters are large. Depending on the cluster sizes, this may yield up to 40 times shorter computing times according to field studies. This is furthermore relevant to the operation of vehicle components.

Similar to the smallest cluster, the following may be done with the unselected data points. The unselected data points of the other clusters may be saved in a data memory. These data points may then also be used as test data and/or as validation data. In addition to the even distribution of the scenarios, a high volume of test and validation data is simultaneously provided by the selection.

Selecting the data points from the other clusters $C_1, \ldots, C_{i-1}, C_{i+1}, \ldots, C_m$ may also be random in order to save computing time. For example and as described above, the data points $R_1, \ldots, R_k$ of the other clusters $C_1, \ldots, C_{i-1}, C_{i+1}, \ldots, C_m$ are selected such that the selected data points of a cluster have a maximum distance from each other. For example, redundant data points are thereby removed, and the relevant data points defining the cluster are added to the training data set.

This training data set may for example be employed by using test data from the unselected vehicle data to avoid overadaptation, or respectively to find the optimum operating point in order to train an algorithm for machine learning, for example an artificial neural network.

Figure 4:
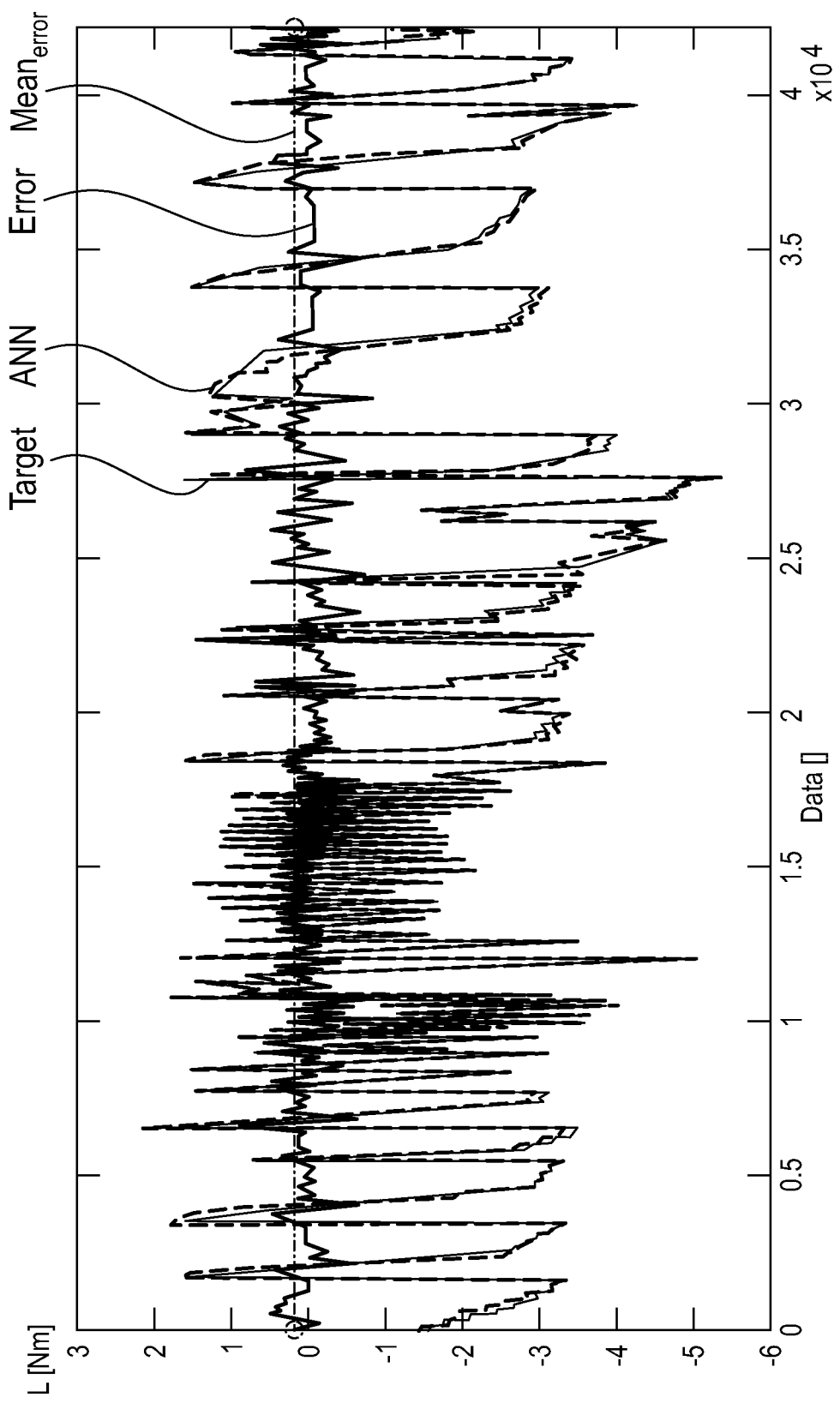
Figure 5:
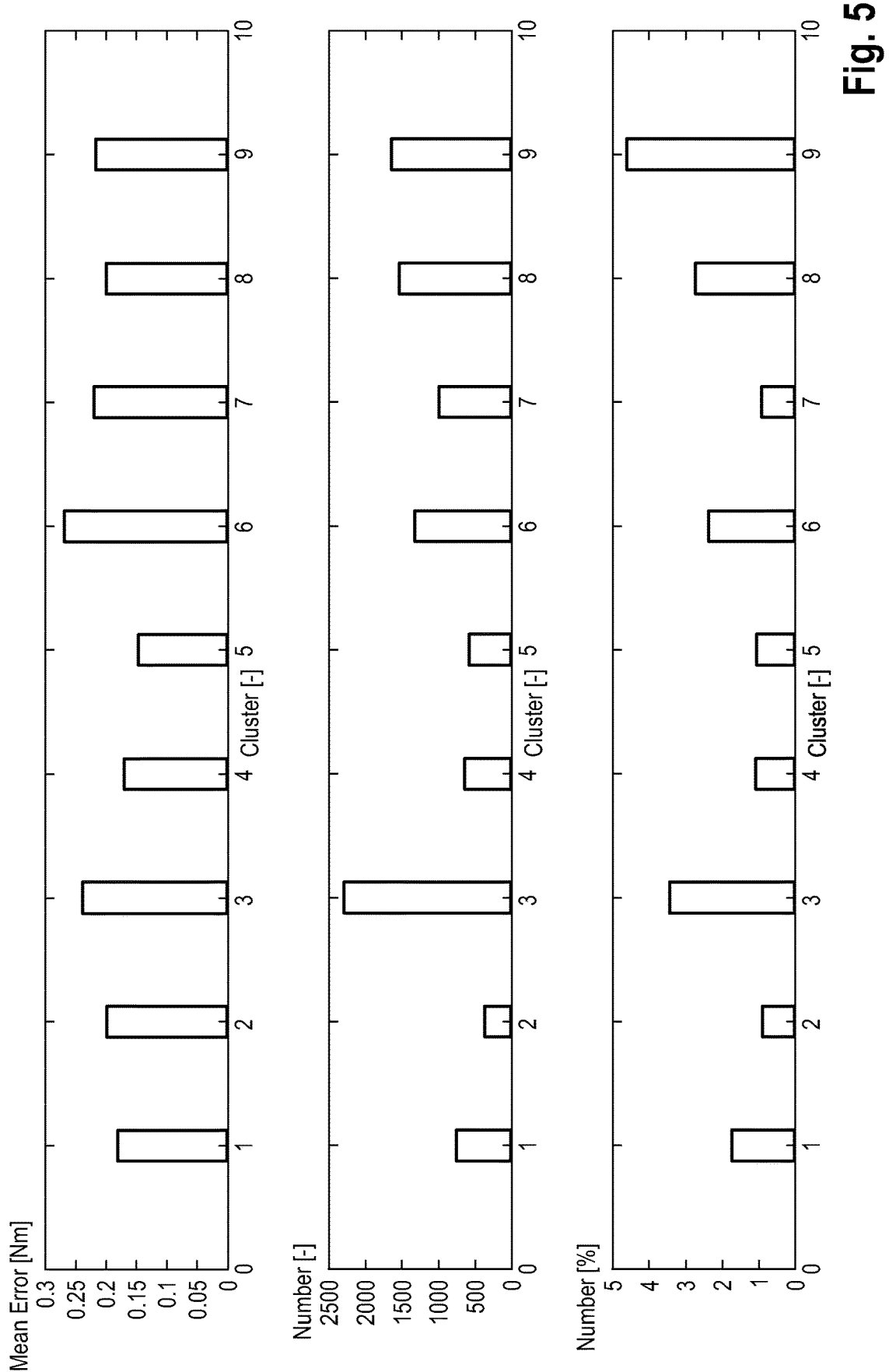
Figure 6:
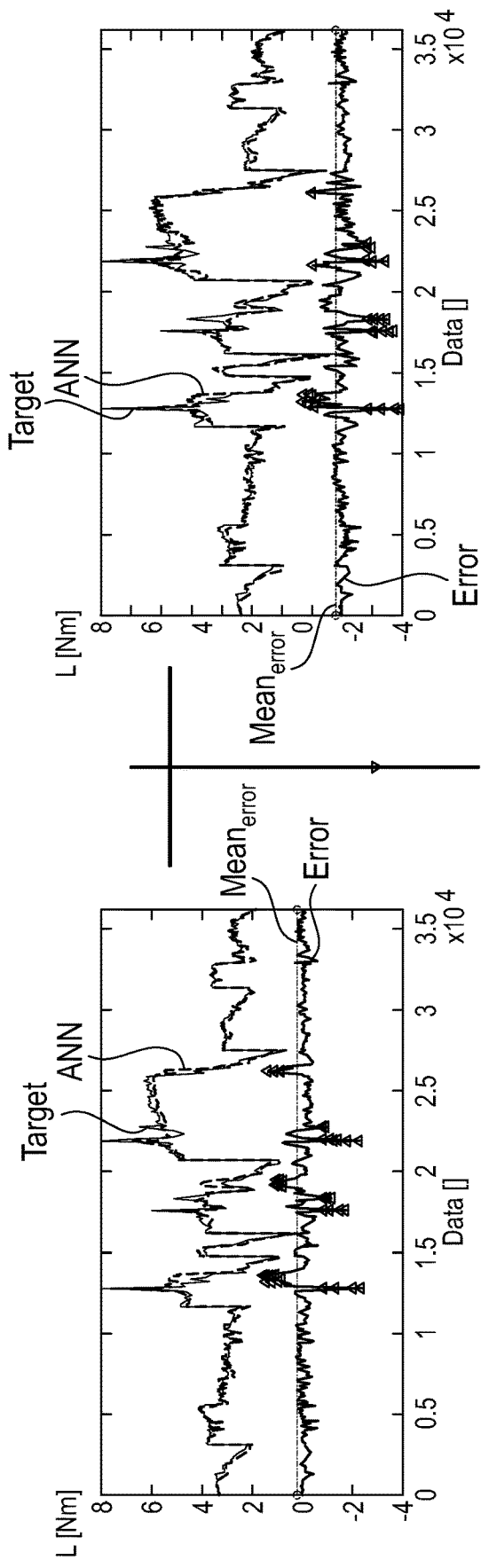

FIGS. 4 to 6 show other steps of the method for improving the compiled training data set for operating vehicle components.

To this end, an algorithm for machine learning, for example an artificial neural network, may be trained in a first step by means of the generated training data step. As already described above, test data may be used during the training. This test data serves to define the optimum operating point while training and to prevent an overadaptation of the neural network. Specific subsets of the group of unselected data points may be used as the test data. The teachings herein have the benefit in this case that such test data are available in a large number through the above-described compilation of the training data set so that the optimum time for terminating training may thereby be specifically established.

By means of validation data, the performance, i.e., the capability of the individual clusters $C_1, \ldots, C_m$ may then be beneficially tested as shown for example in FIG. 4.

FIG. 4 shows the result of a performance test of a first cluster C1. In this regard, FIG. 4 shows a steering torque L determined as an example by means of the validation points. The graphs show the output of the trained artificial neural network as an example of an algorithm for machine learning by using validation data as input. The outputs of the artificial neural network are plotted together with the known target values of the steering torque of the validation data.

The quality of the performance of the cluster is determined in this case by means of a quality criterion. In the present case, it may be beneficial to use the mean square deviation, Mean Err, the output of the algorithm for machine learning, ANN, with the associated target values, Target. In doing so, the mean error, Mean Err, of the algorithm for machine learning is quantified. As another particularly sensitive quality criterion, the number n Err of the mean square deviation lying above a threshold value of target and output values may be determined. In the present example, the graph shows for example 42,274 data points, a mean error of 0.18177 Nm as well as a number of exceeded threshold values of 750, wherein these numerical examples are only added to illustrate the invention.

In this context, it is emphasized that the resolution of the performance of the individual clusters may succeed by using data points of the particular assigned clusters as validation data. These validation data are taken from the group of unselected data points of these associated clusters. The additional benefit is therefore that a plurality of validation data may be provided by the selection and associated reduction of the data points in the clusters when compiling the training data set. These may for example be assigned directly to each cluster, or respectively each scenario. This allows the above-described cluster-related performance to be determined. In the event of a failure, the particular cluster may therefore be located, or respectively found as shown in FIG. 4 with respect to cluster 1.

The checking of the cluster-related performance is also further clarified in FIG. 5 in which the determined performance of the various clusters is combined, i.e., cluster-specific. In the present example, nine different clusters are listed that have each undergone a quality check in the manner described in conjunction with FIG. 4. In this case, the quality quantities of mean square error, mean error, (first line), number of exceeded threshold values, number, and exceeded threshold values in percent are indicated merely for example.

FIG. 6 illustrates another aspect of the method in which the result of another improvement of the training data set is shown.

If a quality criterion of one or more clusters is not satisfied, then additional data points may be added to the training data set for these clusters. The training data set is thereby modified. For example it is determined in one or more clusters according to the above performance test that there were one or too many exceeded threshold values in the mean square deviations depending on the definition of the quality criterion.

Since the loss, or respectively failure, may be assigned to a cluster or relevant clusters (see for example FIGS. 4 and 5), the number of data points of these clusters may then be increased. This may be done by using the unselected data points from just these relevant clusters. Beneficially, the performance of individual clusters may thereby be selectively improved. Automated feedback is thereby achieved.

After adding the additional data points, the above steps of training and checking the performance of the individual clusters, for example the relevant clusters, may be performed repeatedly, wherein reference is made here to the above statements and descriptions.

The result of such an improvement of the training data set for a specific cluster, in this case cluster 9, is shown in FIG. 6. The left part shows for example the performance test of the cluster of the originally compiled training data set. The right part shows the performance of the same cluster of a training data set improved by means of individual data points according to the above descriptions.

The cluster improved by post-training shows a lower mean deviation, Mean Err, of the output value, ANN, from the target value, Target, in the performance test in comparison to the originally compiled cluster. For example, the number, n Err, of the exceeded threshold values is less by several times (see also the markings of the exceeded threshold values indicated by triangles in comparison). The number of exceeded threshold values is therefore a very sensitive measure for assessing performance.

The above-described modification of the training data set may be repeated successively in order to improve the performance of the individual clusters. For example, this may be repeated until all clusters satisfy the set quality criterion. A high-performance algorithm is thereby generated. For example, the improvement may continue until no cluster manifests an exceeded threshold value in the performance test. The method thereby enables successive and automatic improvement of the training data set until the modified training data set satisfies the quality criterion or quality criteria in all clusters. This improvement loop may be automatic without an imminent intervention being necessary.

By means of the described method, a high-performance algorithm for machine learning may be provided. The output of this algorithm for machine learning possessing the above-described special features may then be used in a method for operating a vehicle component. The control, or respectively regulation, or respectively operation of the vehicle component is in response to the output of the high-performance algorithm for machine learning trained according to the learning method.

Figure 7:
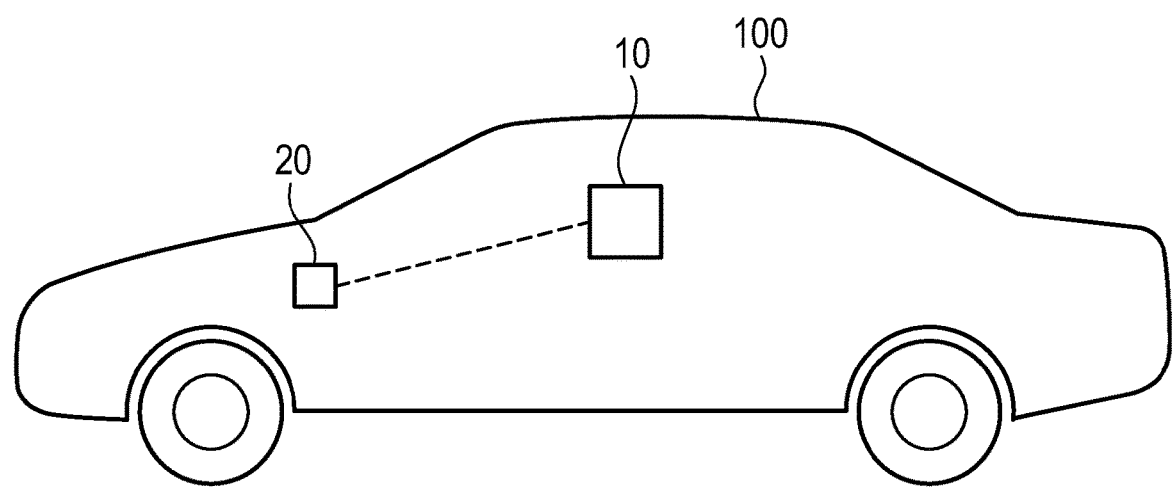
FIG. 7 schematically shows an embodiment of a control unit.

FIG. 7 schematically shows a control unit 10 according to an embodiment. The control unit 10 is configured to execute the above described method. For example, the control unit 10 may operate a vehicle component 20 in response, or respectively based on an output of the above algorithm for machine learning. The control unit 10 may, in principle, also be part of the vehicle component 20. In certain applications, the vehicle component 20 may for example be a steering wheel, wherein the control unit 10 uses the output of the algorithm for machine learning for steering torque approximation as for example is necessary in steer-by-wire systems. In other examples, tire parameters may be approximated. However, the invention is not limited to these examples. The training data set formed by the method in its various embodiments increases the performance of the algorithm for machine learning. The aspects of the method therefore directly yield an improvement in the operation of the vehicle component 20.

LIST OF REFERENCE NUMERALS

10 Control unit
20 Vehicle component
100 Vehicle
F1, . . . , Fn Data points
C1, . . . , Cm Clusters
T1, . . . , Tk Selected data points of the first cluster
R1, . . . , Rk Selected data points of the other clusters

What is claimed is:

1. A computer-implemented method for machine learning to operate a vehicle component comprising:
providing a plurality of multidimensional data points;
generating a basic training data set by dividing up the plurality of data points into multidimensional clusters using a cluster algorithm such that each data point is assigned precisely to one cluster;
generating a training data set by selecting data points from the basic training data set, comprising:
determining a smallest cluster among the plurality of clusters with the lowest number of data points;
selecting at least one subset of the data points of the smallest cluster for the training data set; and
selecting a subset of data points from each of the other clusters for the training data set such that the number of selected data points of each other cluster corresponds to the number of selected data points of the smallest cluster.

2. The method of claim 1, furthermore comprising: saving the unselected data points of the smallest cluster and/or the other clusters in a data memory as test and/or validation data for an algorithm for machine learning.

3. The method of claim 2, furthermore comprising the selection of the totality of all data points of the smallest cluster for the training data set.

4. The method of claim 2, wherein the selection of data points from the smallest cluster and/or the other clusters is random.

5. The method of claim 2, wherein the data points are selected from the smallest cluster and/or the other clusters such that the selected data points of a cluster have a maximum distance from each other.

6. The method of claim 1, furthermore comprising the selection of the totality of all data points of the smallest cluster for the training data set.

7. The method of claim 6, wherein the selection of data points from the smallest cluster and/or the other clusters is random.

8. The method of claim 1, wherein the selection of data points from the smallest cluster and/or the other clusters is random.

9. The method of claim 1, wherein the data points are selected from the smallest cluster and/or the other clusters such that the selected data points of a cluster have a maximum distance from each other.

10. The method of claim 1, furthermore comprising a training of an algorithm for machine learning using the generated training data set.

11. The method of claim 10, furthermore comprising the determination of the performance of the individual clusters by means of a quality criterion by using validation data.

12. The method of claim 11, furthermore comprising the determination of the performance of the individual clusters by the data points from the group of unselected data points of the associated clusters.

13. The method of claim 11, wherein the quality criterion comprises a mean square deviation above a threshold value of an output value relative to the target value.

14. The method of claim 11, furthermore comprising the creation of a modified training data set by adding data points to a cluster for which the quality criterion has not been met.

15. The method of claim 14, wherein the added data points are taken from the group of unselected data points of the cluster for which the quality criterion is not met.

16. The method of claim 14, furthermore comprising the repetition of the modification of the training data set until the quality criterion is satisfied for all clusters.

17. A method for operating a vehicle component comprising the operation of the vehicle component based on an output of an algorithm for machine learning trained according to the method of claim 1.

18. A control unit for a vehicle, configured to execute the method of claim 17.

19. A vehicle comprising the control unit of claim 18.

20. A control unit for a vehicle, configured to execute the method of claim 1.

* * * * *